Patented Nov. 23, 1926.

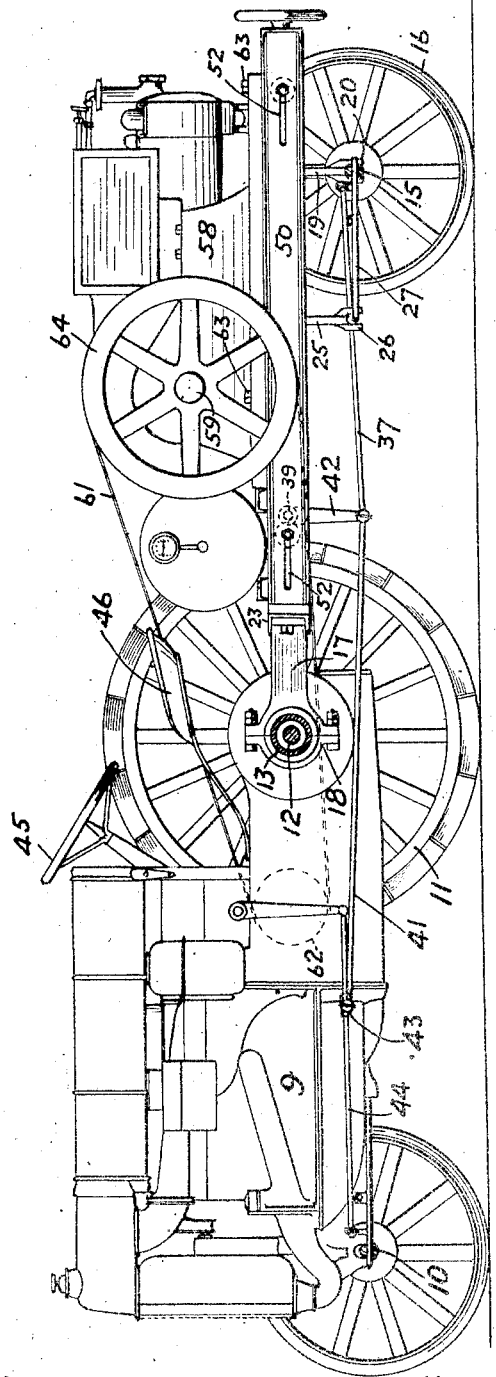

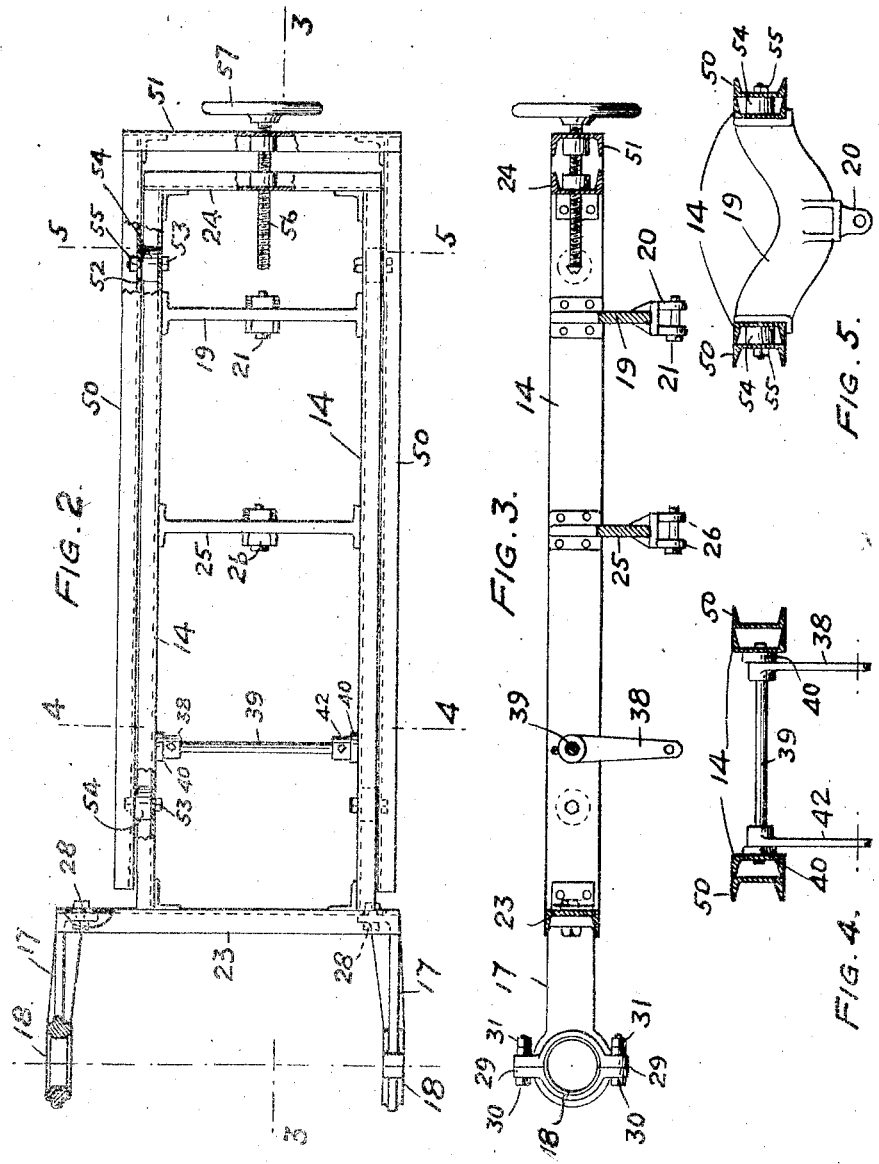

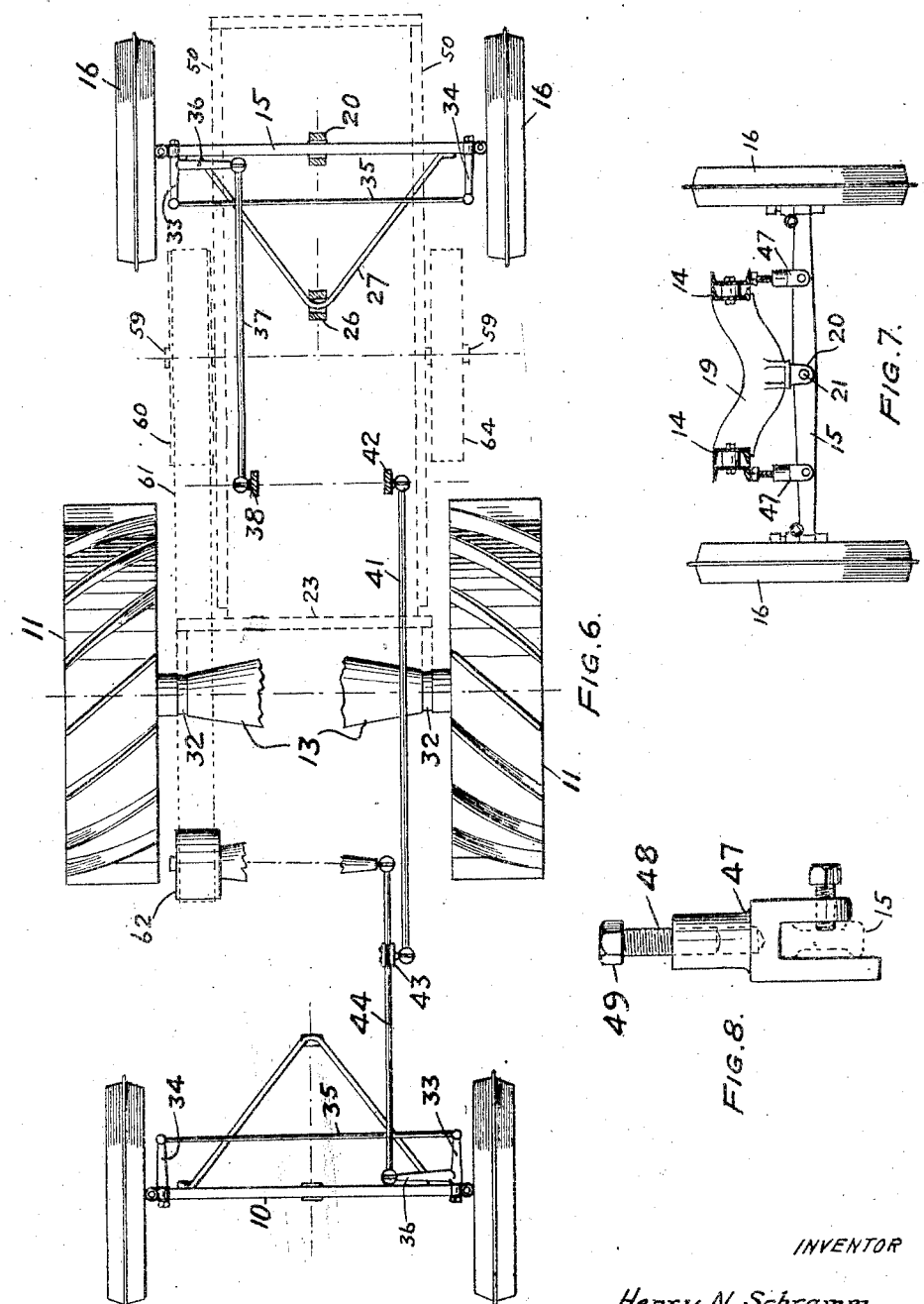

1,608,468

UNITED STATES PATENT OFFICE.

HENRY N. SCHRAMM, OF WEST CHESTER, PENNSYLVANIA, ASSIGNOR TO SCHRAMM, INC., OF WEST CHESTER, PENNSYLVANIA, A CORPORATION OF PENNSYLVANIA.

UNIVERSAL CHASSIS.

Application filed September 30, 1924. Serial No. 740,692.

This invention relates to trailers and more particularly to such as are adapted to be connected or coupled with a tractor such as a Fordson to be moved from place to place and the connection is made in such a manner as to permit of the transmission of power from the prime mover of the tractor to a power generating unit mounted upon the trailer either when the vehicles are standing or while they are in motion.

The principal object of my improvements is to provide a universal trailer adapted to carry a variety of power driven or generating units to be transported by and operated from a tractor at a distance from the centres of manufacture or sources of supply, the elements and parts which enter into the construction of the trailer being either duplicates of those of the tractor or standard or stock parts, and some, if not most, of the elements and parts of the tractor or trailer may be used interchangeably.

Another object of this invention is a chassis comprising two frames mounted in a horizontal plane, one of the frames being adapted for connection with a tractor and the other to carry machinery, the machinery carrying frame being adapted to be mounted on or removed from the other, or moved rearwardly or frontwardly to either lengthen or shorten the chassis.

A further object is a universal chassis adapted to provide the base for a large variety of power driven generating units such as portable air compressors, pumps, electric light and power plants, hoists, rock drill, road builders, etc.

A still further object is a universal trailer chassis or base for portable power plants provided with means for permanent connection with a tractor for transportation and with means for positioning the plant for the transmission of power to it from the prime mover of the tractor.

A still further object is a universal trailer adapted for connection with a tractor in such a manner as to prevent a relative sideways displacement between the tractor and trailer in a horizontal plane and to permit of a relative displacement in a vertical plane to compensate for the inequalities of the roads or ground.

A still further object is a universal trailer adapted for connection with a tractor, the rear end of the trailer being supported by an axle and wheels which are the duplicate of those supporting the front end of the tractor and provided with a steering mechanism which is the duplicate of that of the tractor and connected to be operated from the tractor.

A still further object is a universal trailer provided with a shaft adapted to be positioned with relation to a shaft of a tractor to permit of the transmission of power from the shaft of a prime mover of a tractor to the trailer shaft.

A further object is a trailer connected with a tractor to swing relatively in a vertical plane and mounted on an axle adapted to swing on a pivot, and adjustable means on opposite sides of the pivot adapted to support the trailer in horizontal alignment with the tractor.

A further object is to improve and simplify the construction, increase the utility, efficiency and economy, and provide for the continuous operation of the devices to which this invention relates.

With the above and related objects this invention comprises the construction, combination and arrangement hereinafter more fully described, a preferred embodiment whereof is illustrated in the accompanying drawing which, however, may be varied by those skilled in the art without departing from this invention and be within the scope of the appended claims.

In the accompanying drawing;—

Fig. 1, is a side elevation of the improved trailer shown in connection with a Fordson tractor.

Fig. 2 is a plan of the trailer chassis.

Fig. 3 is a section on the line 3—3 of Fig. 2.

Fig. 4 is a section on the line 4—4 of Fig. 2.

Fig. 5 is a section on the line 5—5 of Fig. 2.

Fig. 6 is a plan of the steering mechanism of the trailer shown in connection with that of the tractor.

Fig. 7 is a rear elevation showing the trailer chassis pivotally connected with the axle of its steering wheels.

Fig. 8 is a view of one of the jacks shown in Fig. 7 between the trailer chassis and its axle.

Referring more particularly to the drawing for a detail description of my invention, the reference numeral 9 designates the chassis of the prime mover of a Fordson tractor, provided in the front with steering wheels at the opposite ends of an axle 10 and provided in the rear with traction wheels 11 mounted at the opposite ends of a differentially connected two-part axle 12 projecting outwardly of a housing or casing 13.

The trailer, shown in the rear of the tractor, comprises a chassis frame having longitudinal sides 14 supported in the rear by an axle 15 and wheels 16, and is provided at its front with arms 17 and split collars 18 spanning the housing 13. The sides 14 are joined transversely by a bar 19 having a depending central portion provided with perforated ears 20 for a pin 21. The bar 19 is in alignment with the axle 15, the pin 21 pivotally connecting the axle with the ears 20 of the bar centrally of the axle. The sides 14 are joined in front by a bar 23 and in the rear by a bar 24, and intermediate said front and rear bars and frontwardly of the bar 19 the sides are joined by a bar 25 shaped like the bar 19 and similarly provided with ears 26. Between the ears 26 is pinned the apex of an angular brace 27, the legs whereof are joined with the axle 15.

The bar 23 joining the forward ends of the sides 14 is extended outwardly of the sides, the extensions being provided with elongated holes registering with the bolt holes of the arms 17 for bolts 28. The split collars 18 of the arms 17 are provided with ears 29 for bolts having heads 30 and lock-nuts 31. The collars 18 are provided interiorly with cylindrical flanges for the peripheral grooves 32 of the housing 13, shown in Fig. 6.

The trailer wheels 16, which are duplicates of the front wheels of the tractor, are pivotally connected with the trailer axle 15 in the same manner as the front wheels of the tractor are connected with the tractor axle 10, which axle is similarly braced by a brace of which the brace 27 is a duplicate. The trailer wheels 16 are adapted to be steered by a mechanism which is a duplicate of that of the tractor comprising arms 33 and 34 connected with the wheels 16 where they are joined with the axle 15, the free ends of the arms being connected by ball and socket joints with the opposite ends of a tie rod 35. Arm 33 of the trailer is provided with an arm 36 connected by a ball and socket joint with one end of a longitudinal steering rod 37. The free end of the rod 37 is connected by a ball and socket joint with an arm 38 depending from a rock shaft 39 supported by bearings 40 interiorly of the sides 14. A connecting rod 41 is connected at one end by a ball and socket joint with an arm 42 depending from the shaft 39 in alignment with the arm 38 and at its opposite end is connected by a ball and socket joint with a bracket 43 of the longitudinal steering rod 44 of the steering mechanism of the tractor operatively connected by the steering post provided with the steering hand-wheel 45 in front of the operator's seat 46 of the tractor.

Upon the axle 15 adjacent the wheels 16 are mounted sockets 47 provided interiorly with threads to mesh with the threads of bolts 48 provided with square face heads 49 and constituting means to jack the trailer chassis in alignment with that of the tractor.

The trailer chassis is provided with an exterior frame having sides 50 adjacent the sides 14 of the interior frame, the rear ends of said sides 50 being joined by a bar 51 rearwardly of the interior frame. The sides 50 of the exterior frame are provided at their opposite ends with longitudinal slots 52 registering with holes in the sides 14 of the interior frame for bolts provided with heads 53 and lock-nuts 55, the bolts being projected through spacing collars 54. The rear bars 24 and 51 of the interior and exterior frames are provided centrally with threaded holes for a threaded stem 56 provided with a wheel head 57.

On top of the trailer chassis is mounted a base 58 of a power driven or generating unit such as the air compressor shown in Fig. 1, the base being provided with bearings for a shaft 59 carrying a pulley 60, shown to be connected by a belt 61 with the pulley 62 of the tractor. The base 58 is shown to be connected with the exterior frame by bolts 63, and is adapted to slide upon the interior frame rearwardly or frontwardly of the tractor by turning the hand wheel 57 when the nuts 55 of the bolts joining the sides of the frames are loosened, and when the bolts are removed altogether the exterior frame may be slid off or on the interior frame.

The trailer is intended to be drawn by the tractor to various places and over rough and uneven ground, and to provide for the trailer to be properly supported by its wheels, it is adapted to swing in a vertical plane by means of the flanges of the coupling collars 18 and the peripheral grooves of the housing 13, while the sides of the grooves prevent any relative sideways displacement between the tractor and trailer to prevent the belt from slipping off the pulleys. To prevent the belt from slipping off the pulleys while it is transmitting power from the tractor shaft to the trailer shaft, the shafts must be in alignment with their pulleys. This may be accomplished by means of the jacks 47 mounted upon the trailer axle, although, normally, the jacks may be dispensed with, since the fly wheel 64 mounted on the shaft opposite the pulley 60 is ordinarily adapted to balance the trailer chassis upon its axle with which it is pivotally connected to swing in the plane of the tractor chassis.

When the steering hand-wheel 45 of the tractor is turned to steer the wheels of the axle 10, the connecting rod 32 causes the steering rod 37 of the trailer to move in the same direction as the steering rod 44 of the tractor and the wheels of the trailer assist in the steering of the tractor and trailer as a single unit, since the steering mechanisms, axles, wheels, supports and braces of both units are duplicates.

What I claim is—

1. In combination with a tractor, of a two-wheel axle rearwardly thereof, a base for a body connecting the tractor with the axle, a frame about the base, a body adapted to be mounted upon the base connected with the frame, means for moving the frame lengthwise of the base with the body thereon, means for guiding the body upon the base, and means for locking the guiding means to prevent said movement.

2. The combination claimed in claim 1, said tractor including a steering wheel, and means for steering the two wheel axle operatively connected with the steering wheel.

3. In combination with a tractor provided with a driving element, of a two-wheel axle, a base for a driven element connected with the tractor, to swing vertically, means connecting the base with the axle to permit it to swing transversely of the base, a driven element adapted to be mounted upon the base, means adapted to connect said element with the base comprising means to move the element towards and away from the driving element and means to guide the driven element upon the base in parallel alignment with the driving element, and adjustable means between the base and the axle adapted to support the driven element with its base in horizontal alignment with the driving element.

4. The combination claimed in claim 3, including means to lock the guiding means to hold the driven element with its base in said alignment with the driving element, and means adapted to operatively connect said elements.

5. In combination with a tractor provided with a steering wheel, a two-wheel trailer connected with the tractor, a body adapted to be mounted upon the trailer as a base, means adapted to connect the body with the trailer and comprising means to move the body lengthwise of the trailer and means to hold and guide the body thereon, means for steering the trailer wheels, and means operatively connecting the steering means with the steering wheel.

6. The combination claimed in claim 5, said trailer including an axle provided with pivots for the wheels to swing in a horizontal plane, means pivotally connecting the trailer with its axle to permit it to swing transversely of the trailer, and means to prevent the axle from swinging horizontally.

7. In combination with a tractor provided with a driving element, a two-wheel axle trailer comprising a base mounted upon the axle and connected with the tractor to swing vertically, means pivotally connecting the base with the axle to permit it to swing transversely, means connecting the base with the axle to prevent it from swinging horizontally, a driven element adapted to be mounted upon the base provided with means for connection therewith and to be held in parallel alignment with the driving element, means adapted to operatively connect said elements, and means between the axle and the base adapted to prevent a relative angular displacement between said elements.

8. The combination claimed in claim 7, said tractor including a steering wheel, and means for steering the wheels of the trailer operatively connected with the steering wheel of the tractor.

9. A chassis comprising an inner frame and an outer frame, means for moving the outer frame lengthwise of the inner frame, an axle under the chassis pivotally connected with the inner frame to swing in a vertical plane, wheels at the opposite ends of the axle pivotally connected therewith, means for swinging the wheels in a horizontal plane, and means to hold the axle from swinging in the plane of the wheels.

10. The combination claimed in claim 9, including means mounted upon the axle on opposite sides of its pivoted connection with the inner frame to prevent any relative swinging movement between the chassis and the axle.

11. The combination with a tractor, of a trailer comprising an inner frame and an outer frame, an axle in the rear of the trailer provided with wheels adapted to support the trailer at the level of the tractor, rigid means depending from the inner frame centrally over the axle pivotally connected therewith, arms extending frontwardly of the trailer rigidly connected with the inner frame in alignment with its opposite sides and including means for connection with the tractor to prevent a relative angular displacement between the tractor and trailer, means connecting the outer frame with the inner frame and means for moving the outer frame, lengthwise of the inner frame.

12. The combination claimed in claim 11, said connecting means including means adapted to permit of a relative swinging movement between the tractor and the trailer in a vertical plane, and to prevent a relative sideways displacement in a horizontal plane.

13. The combination with a tractor chassis, of a trailer chassis in rear of the tractor chassis, means for connecting said chasses including arms extending frontwardly of the trailer on the opposite sides of its chassis to prevent a relative angular displacement between the chasses and to hold them at a fixed distance apart and including means adapted to permit them to swing relatively in a vertical plane, an axle transversely of the trailer chassis and wheels at the opposite ends of the axle normally adapted to support the trailer chassis at the level of that of the tractor, and bracing means connecting the axle with the trailer chassis to prevent a relative horizontal displacement therebetween.

14. The combination claimed in claim 13, said trailer chassis including a cross bar in alignment with the axle, and means depending from the bar centrally of the axle and pivotally connected therewith to permit of a relative swinging movement between the axle and the trailer in a vertical plane only.

15. The combination with a tractor chassis, a trailer chassis connected with the tractor chassis, means transversely of the trailer chassis including an axle at the rear end of the chassis normally adapted to support the trailer chassis at the level of the tractor chassis, means pivotally connecting said axle with the trailer chassis adapted to permit of the chassis to swing in a vertical plane only, and means between the chassis and axle adapted to jack up either end of the trailer chassis to prevent a relative angular displacement of said chasses.

16. The combination claimed in claim 15, and means connecting the trailer chassis with its axle adapted to prevent it from swinging horizontally.

17. The combination of a tractor and trailer, said tractor provided with wheels at its front end and a steering mechanism therefor, an axle in the rear of the trailer centrally connected to swing vertically and adapted to prevent the axle from swinging horizontally, wheels pivotally connected with the axle to swing horizontally, a rock shaft suspended transversely of the trailer, a steering rod to each wheel, a rod alongside the axle connecting the steering rods, a rod between the rock shaft and the connecting rod, connected by a universal joint at one end with one of the steering rods and by a similar joint at its opposite end with the rock shaft, and means connecting the steering mechanism of the tractor with the rock shaft of the trailer.

18. The combination claimed in claim 17, said connecting means between the steering mechanism and the rock shaft comprising a rod provided with a universal joint connecting it with the steering mechanism and a similar joint connecting it with the rock shaft.

19. The combination, with a tractor unit which includes a motor driven axle, a housing therefor and a motor driven shaft, of a trailer unit including a frame provided with bearings and a shaft supported thereby in parallel alignment with the motor driven shaft, couplings connecting said units in parallel alignment, means operatively connecting the trailer shaft with that of the tractor, and means centrally of the rear of the frame connecting it with the trailer unit for moving the bearings of the trailer shaft towards and away from the tractor shaft.

20. The combination claimed in claim 19, said couplings including means connected with the housing of the tractor axle adapted to permit of a relative swinging movement in a vertical plane and to prevent a relative sidewise and angular displacement between said units.

21. The combination, with a tractor including an axle and housing therefor including a frame provided with peripheral grooves, of a trailer provided with couplings connecting it with the tractor, said couplings including annular rings registering with the grooves of the axle housing of the tractor, said housing with its grooves serving as bearings for the couplings, shaft supporting bearings mounted upon a frame lying in the plane of the coupling frame and means for connecting and disconnecting the frames, said tractor including a motor driven shaft, and means operatively connecting the tractor shaft with the trailer shaft.

22. The combination claimed in claim 21, said couplings being of an interior diameter slightly larger than that of the housing, its rings having a width slightly less than that of the grooves, and the interior diameter of the rings being slightly larger than that of the grooves.

23. The combination of a tractor unit including a prime mover, a trailer rearwardly of the tractor unit including a frame as a base, a driven unit mounted on said frame, couplings adapted to hold the frame at a fixed distance from the tractor unit, driving means between the prime mover and driven unit, and means centrally of the frame for moving the driven unit upon its base towards and away from the prime mover to cause the driving means to operatively connect the prime mover with the driven unit.

24. The combination claimed in claim 23, means connecting the base with the driven unit adapted to guide it during said movement, and means to cause said guides to prevent said movement.

25. The combination of a tractor provided with a prime mover adapted to propel the tractor and including a transversely mounted shaft, a trailer in rear of the tractor provided with a driven unit including a transversely mounted shaft, couplings connecting the tractor with the trailer adapted to permit of a relative swinging movement in a vertical plane therebetween with their shafts in parallel alignment, means connecting the driven unit with the trailer operable to move said unit lengthwise of the trailer, means connecting the driven unit with the trailer to guide it with its shaft in alignment with the tractor shaft, means to cause the guiding means to prevent the operable means from moving the driven unit upon the trailer, and means operatively connecting said shafts.

26. The combination claimed in claim 25, said moving, guiding and operating means adapted to be removed to permit of the mounting and dismounting of the driven unit from the trailer.

27. The combination with the rear axle housing of a tractor, said housing provided peripherally with grooves, a trailer provided in front with couplings adapted to span the housing, said couplings including rings adapted to register with the housing grooves, as bearings to permit of a relative swinging movement between the tractor and trailer in a vertical plane and to prevent a relative sidewise or angular displacement therebetween, an axle in the rear of the trailer, said trailer including a cross bar parallel with the housing, means pivotally connecting the cross bar with the axle, to permit it to swing vertically, a second cross bar and a brace pivotally connected with the second cross bar and rigidly connected with the axle of the trailer on the opposite sides of the pivot to prevent the axle from swinging horizontally.

28. The combination claimed in claim 27, the connections between the trailer and tractor being adapted to prevent a relative angular displacement therebetween when the axle swings on its pivot.

29. The combination with the rear axle housing of a tractor, a trailer frame connected with the housing to swing thereon vertically and extending rearwardly thereof and in horizontal alignment therewith, an axle parallel with that of the housing supporting the frame at its rear end at the level of the housing, a second frame exteriorly of the first frame and in horizontal alignment, said second frame being connected to slide alongside the first frame, means adapted to hold the second frame in the plane of the first frame and means for sliding the second frame towards and away from the housing.

30. The combination claimed in claim 29, said housing provided with circumferential grooves and said connected frame including a pair of arms provided with annular rings registering with the grooves to hold the tractor and trailer in parallel alignment at all times.

31. In combination with a tractor provided with a power driven shaft transversely thereof, a two wheeled trailer, a power driven unit mounted thereon including a transversely mounted shaft, means to operatively connect said shafts, couplings between the tractor and trailer adapted to permit of a relative swinging movement therebetween and to prevent a relative horizontal displacement, means to move the driven unit upon the trailer, and means to prevent said movement.

32. The combination claimed in claim 31, said preventing means adapted to be released to permit of said movement and including means to guide the driven unit upon the trailer with its shaft in parallel alignment with that of the tractor.

33. In combination with a tractor provided with a driving element, a two-wheel axle, a base for a driven element provided with means connecting it with the tractor and with means connecting it with the two-wheel axle, a driven element adapted to be mounted upon said base, means adapted to connect said base with the driven element comprising means for moving it upon the base and to guide it in parallel alignment with the driving element, and means adapted to be mounted upon the guiding means to hold the said elements in said alignment.

34. The combination claimed in claim 33, and means adapted to operatively connect said elements, the connecting means between the base and tractor being adapted to prevent a relative sidewise displacement between said elements and means between the base and its axle adapted to prevent a relative angular displacement between said elements.

35. The combination of a tractor provided with a steering mechanism and with a shaft adapted to be driven by the motor propelling the tractor, the steering and propelling being under the control of an operator mounted upon the tractor, a trailer in the rear of the tractor, said tractor including a rear axle housing, means connecting the trailer with the rear axle housing of the tractor adapted to permit of a relative swinging movement therebetween in a vertical plane and to prevent a relative angular or sidewise displacement, a power driven unit mounted upon the trailer and provided with a shaft in alignment with that of the tractor, a steering mechanism under the trailer, means operatively connecting said shafts, and means connecting said steering mechanisms.

36. The combination claimed in claim 35, including means for moving the power driven unit upon the trailer with its shaft parallel to that of the tractor and means to prevent said movement.

37. The combination of a tractor provided with a power transmitting shaft, a trailer connected with the tractor to swing relatively in a vertical plane, said trailer being adapted to carry a power driven unit provided with a shaft in parallel alignment with that of the tractor, means to operatively connect said shafts, means for moving the power driven unit upon the trailer, means to prevent said movement, means for guiding the unit upon the trailer with its shaft in said alignment with that of the tractor, said tractor including means for steering the trailer.

38. The combination claimed in claim 37, including means adapted to prevent a relative angular or sidewise displacement between said shafts.

39. In combination with the rear axle housing of a tractor including circumferential grooves at the opposite ends of the housing, of a trailer in rear of the tractor provided with couplings including annular rings registering with the grooves and serving as bearings for the housing to rock in, the sides of the grooves being adapted to prevent a relative sidewise displacement between the tractor and trailer.

40. The combination claimed in claim 39, said couplings including arms extending frontwardly of the trailer and rigidly connecting it with the rings to hold the trailer in horizontal alignment with the housing.

41. In combination with the rear axle housing of a tractor, a trailer, a pair of coupling members rigidly connected with the trailer and provided with annular rings about the axle housing of the tractor, to permit of the trailer being propelled by the tractor and to swing relatively in a vertical plane, a two wheel axle at the rear of the trailer pivotally connected to swing transversely of the trailer, and means on opposite sides of the pivoted connection adapted for adjustment to support the trailer in horizontal alignment with the tractor.

42. The combination claimed in claim 41, including means for steering the trailer wheels, and means to prevent the trailer axle from swinging in the plane of its wheels.

43. In combination with the circumferential grooves of the rear axle housing of a tractor, a trailer, a pair of coupling members rigidly connected with the trailer and provided with annular rings about the housing and registering with the grooves to permit of a relative swinging movement between the tractor and trailer and to prevent a relative sidewise displacement therebetween, an axle provided with dirigible wheels pivotally connected with the trailer, and adjustable means on opposite sides of the pivoted connection to prevent a relative angular displacement between the axle housing of the tractor and the couplings connecting it with the trailer.

44. The combination claimed in claim 43, including means pivotally connected with the trailer and rigidly connected with its axle to prevent it from swinging horizontally.

45. In combination with the circumferential grooves of the rear axle housing of a tractor, a trailer in rear of the tractor, a pair of coupling members extending frontwardly of the trailer, each member including an annular ring mounted in a groove of the axle housing as a bearing, and a two wheel axle under the trailer rearwardly of the couplings.

46. The combination claimed in claim 45, including means for disconnecting the couplings from the trailer and the rings from the housing and means to rigidly connect the couplings with the trailer.

In testimony whereof I have attached my signature to this specification.

HENRY N. SCHRAMM.